Jan. 3, 1933.  J. W. HEINEY  1,892,669
ENGINE COOLING DEVICE
Filed Feb. 24, 1932  2 Sheets-Sheet 2

INVENTOR
John W. Heiney,
BY Redding, Greeley, O'Shea & Campbell
HIS ATTORNEYS

Patented Jan. 3, 1933

1,892,669

UNITED STATES PATENT OFFICE

JOHN W. HEINEY, OF ALLENTOWN, PENNSYLVANIA, ASSIGNOR TO INTERNATIONAL MOTOR COMPANY, OF NEW YORK, N. Y., A CORPORATION OF DELAWARE

ENGINE COOLING DEVICE

Application filed February 24, 1932. Serial No. 594,801.

The present invention relates to cooling systems for motor vehicle engines and embodies, more specifically, an improved engine cooling system wherein radiators are mounted rearwardly of the engine and cooling air drawn from a suitable location and circulated through the radiators by an engine driven fan.

Side radiators which are mounted adjacent the rear of an internal combustion engine mounted upon a motor vehicle are used widely in present day automotive practice and such system is not broadly claimed as new herein. The present invention embodies an improved system of this character wherein the air which is circulated through the side radiators is taken from a selected number of spaces in accordance with conditions best situated to the efficient operation of the engine. It is contemplated to provide a cooling system of this character wherein an engine driven fan of the squirrel cage type is utilized to circulate air from predetermined selected locations through the side radiators. The invention proposes providing a convenient drive for the fan whereby the fan may be separated from the power transmitting mechanism driven by the engine and thus located advantageously upon the chassis.

The invention further has for an object the provision of a fan and driving mechanism therefor wherein power is taken from the forward end of the engine and transmitted rearwardly adjacent the rear end of the engine and between the side radiators, the transmission of such power being by means of a mechanism which is independent of the power transmitting mechanism driven by the engine.

A further object of the invention is to provide a cooling system for a motor vehicle comprising side radiators mounted rearwardly of the motor and means for circulating air through such radiators from a selected source.

A further object of the invention is to provide a cooling system of the above character wherein the air which is circulated through the side radiators is taken from either the engine compartment, the interior of the cab, or exteriorly of the vehicle.

Further objects, not specifically enumerated above, will be apparent as the invention is described in greater detail in connection with the accompanying drawings, wherein.

Figure 1:
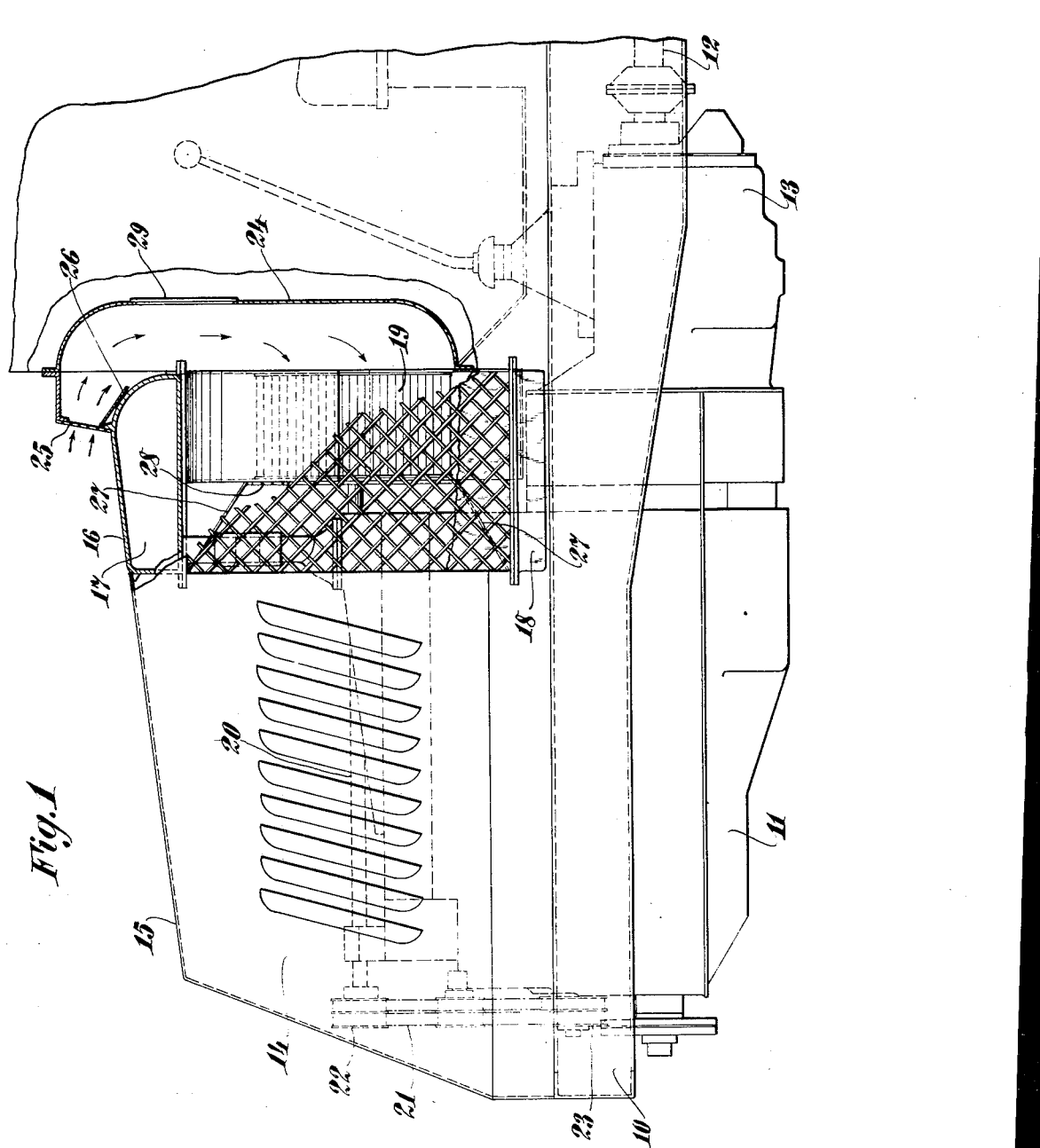
Figure 1 is a view in side elevation, partly broken away and in section, showing an engine cooling mechanism constructed in accordance with the present invention.
Figure 2:
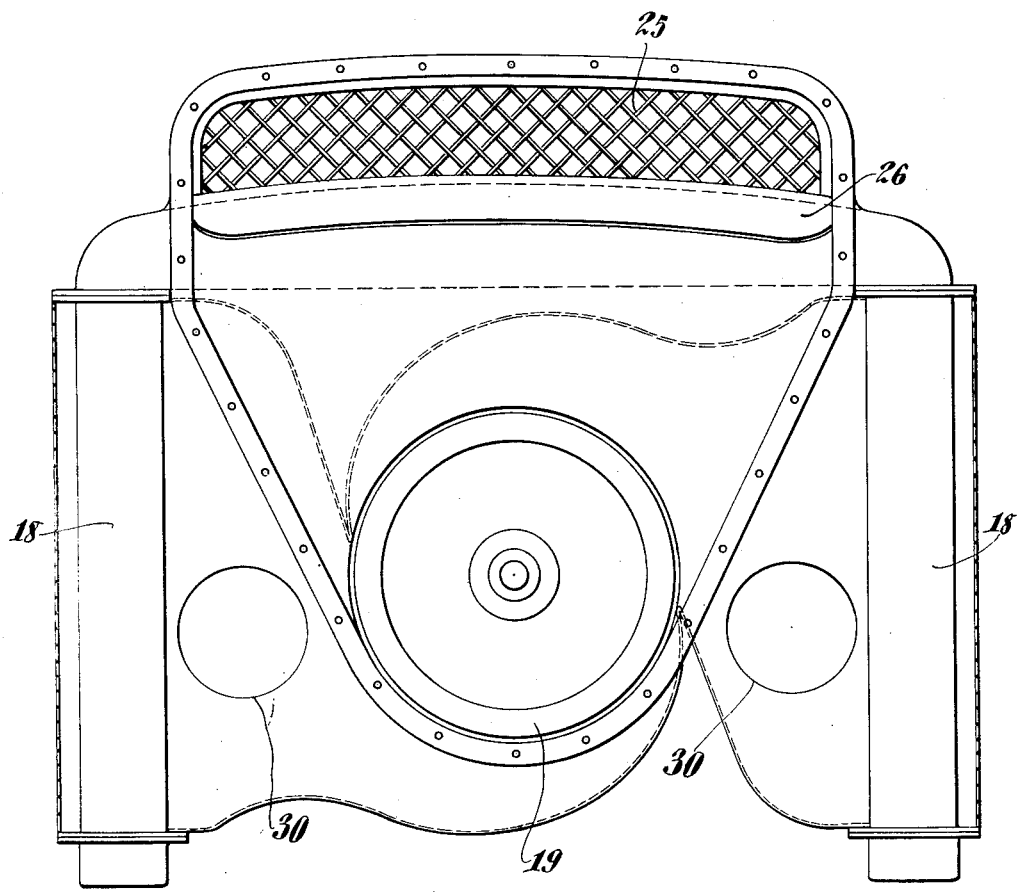
Figure 2 is a view in rear elevation, showing the cooling system of Figure 1, the engine and associated parts being removed in the interest of clearness.

With reference to the above drawings, the frame of a motor vehicle is shown at 10, and is provided with an engine 11 which is mounted thereon for supplying power to a propeller shaft 12 through a transmission mechanism 13. The engine is housed within a compartment 14 formed by a hood 15 which terminates in a cowl portion 16 just forwardly of the control cab. Cowl 16 is preferably formed as an upper collecting tank 17 for the circulating liquid, the fluid in the tank being received from the engine and circulated downwardly through side radiators 18. This particular arrangement of engine and radiators is not new and is not claimed herein as a part of the present invention.

Rearwardly of the engine, and in substantially the plane of the side radiators, a squirrel cage fan 19 is provided. This fan is mounted upon a shaft 20 which is journaled upon the engine and driven by a belt 21 and pulley 22. Belt 21 receives power from a pulley 23 which is mounted upon or driven by the crank shaft of the engine. Communicating with the interior of the squirrel cage of the fan is a channel 24 which forms a duct communicating with the interior of the vehicle through a grating or other suitable opening 25 formed in the cowl of the vehicle. In Figure 1, the arrows indicate the direction of circulation of air to the fan and, in warm weather, the foregoing circulation takes place. If desired, the grating or opening 25 may be closed by means of a suitably hinged plate 26. Forwardly of the fan, deflecting cowl 27 is provided to direct air from the engine compartment into the interior of the squirrel cage of the fan. An adjustable grating 28 is provided to prevent such circulation under predetermined conditions and, in this fashion, during cold weather, air is taken directly from the engine compartment and directed through the radiators. In warm weather, on the other hand, the plate 28 is closed and plate 26 opened in order that air may flow in the direction indicated by the arrows. An adjustable plate 29 is formed in the wall of the channel 24 whereby air may be drawn into the channel from the interior of the cab. Shutters 30 may be provided to enable the interior of the cab to be heated.

From the foregoing, it will be seen that the side radiators may be placed in any convenient position with respect to the axis of the engine and in the form illustrated in the drawings, such radiators are shown as mounted considerably above the engine. The cooling mechanism for directing air through these radiators is greatly simplified and rendered highly efficient in view of the fact that the fan does not necessarily have to be secured directly to the transmission or crank shaft, as has been the practice heretofore. This objectionable requirement heretofore confronting the designers has been overcome by the provision of the independent fan drive shown in Figure 1, wherein power is taken directly from the forward end of the crank shaft for actuating the fan.

By conveniently adjusting the plates 26 and 28, air may be circulated through the radiators from either the interior of the engine compartment or the exterior of the vehicle, as previously described. The adjustable grating 29 also enables the interior of the cab to be ventilated in an obvious fashion.

While the invention has been described with specific reference to the accompanying drawings, it is not to be limited, save as defined in the appended claims.

I claim as my invention:

1. A cooling system for an engine having a hood and side radiators mounted adjacent the rear of the engine; a fan for circulating air through the radiators, and means to direct air selectively from outside and from within the hood to the fan.

2. A cooling system for an engine having a hood and side radiators mounted adjacent the rear of the engine, a fan for circulating air through the radiators, means to direct air to the fan from outside the hood, and means to direct air from inside a control cab to the fan.

3. A vehicle chassis comprising a frame, an engine mounted thereon, a hood for the engine, side radiators mounted above the frame adjacent the rear of the engine and hood, a squirrel cage fan between the radiators, means to drive the fan from the front of the engine, and means to direct air to the fan from the outside of the hood and above the same.

4. A vehicle chassis comprising a frame, an engine mounted thereon, a hood for the engine, side radiators mounted above the frame adjacent the rear of the engine and hood, a squirrel cage fan between the radiators, means to drive the fan from the front of the engine, and a forwardly directed duct to direct air from the outside of the hood to the fan.

5. A vehicle chassis comprising a frame, an engine mounted thereon, a hood for the engine, side radiators mounted above the frame adjacent the rear of the engine and hood, a squirrel cage fan between the radiators, means to drive the fan from the front of the engine, means to direct air from under the hood to one side of the fan, and means at the other side of the fan to direct air thereto from the outside of the hood.

6. A vehicle chassis comprising a frame, an engine mounted thereon, a hood for the engine, side radiators mounted above the frame adjacent the rear of the engine and hood, a squirrel cage fan between the radiators, means to drive the fan from the front of the engine, a collecting tank above the radiators and flush with the top of the hood, and a forwardly directed duct at the rear of the hood to direct air to the fan from the outside of the hood.

This specification signed this 12 day of February A. D. 1932.

JOHN W. HEINEY.